United States Patent
Eleazer

(10) Patent No.: US 10,442,142 B1
(45) Date of Patent: Oct. 15, 2019

(54) VEHICLE CONTAINING A STIFF COMPOSITE

(71) Applicant: Milliken & Company, Spartanburg, SC (US)

(72) Inventor: Howell B. Eleazer, Chesnee, SC (US)

(*) Notice: Subject to any disclaimer, the term of this patent is extended or adjusted under 35 U.S.C. 154(b) by 112 days.

(21) Appl. No.: 16/005,890

(22) Filed: Jun. 12, 2018

Related U.S. Application Data

(60) Provisional application No. 62/519,967, filed on Jun. 15, 2017.

(51) Int. Cl.
| | | |
|---|---|---|
| *B29C 70/14* | (2006.01) | |
| *B29C 70/86* | (2006.01) | |
| *D01F 6/06* | (2006.01) | |
| *B29C 70/08* | (2006.01) | |
| *B29L 31/30* | (2006.01) | |
| *B32B 5/02* | (2006.01) | |
| *B32B 27/08* | (2006.01) | |
| *B32B 27/12* | (2006.01) | |

(52) U.S. Cl.
CPC ............ *B29C 70/14* (2013.01); *B29C 70/086* (2013.01); *B29C 70/865* (2013.01); *D01F 6/06* (2013.01); *B29L 2031/3005* (2013.01); *B32B 5/024* (2013.01); *B32B 27/08* (2013.01); *B32B 27/12* (2013.01); *B32B 2250/40* (2013.01); *B32B 2255/02* (2013.01); *B32B 2260/023* (2013.01); *B32B 2262/0215* (2013.01); *B32B 2307/518* (2013.01); *D10B 2321/021* (2013.01); *D10B 2321/022* (2013.01); *D10B 2401/041* (2013.01); *D10B 2401/062* (2013.01)

(58) Field of Classification Search
CPC ..... B29C 70/14; B29C 70/865; B29C 70/086; D01F 6/06; B29L 2031/3005; B32B 5/024; B32B 27/08; B32B 27/12; B32B 2250/40; B32B 2255/02; B32B 2260/023; B32B 2262/0215; B32B 2307/518; D10B 2321/021; D10B 2321/022; D10B 2401/041; D10B 2401/062
See application file for complete search history.

(56) References Cited

U.S. PATENT DOCUMENTS

| | | | |
|---|---|---|---|
| 6,045,923 A | 4/2000 | Kok et al. | 428/517 |
| 6,863,976 B2 | 3/2005 | Morin et al. | 428/364 |
| 7,294,383 B2 | 11/2007 | Callaway et al. | 428/86 |
| 7,294,384 B2 | 11/2007 | Eleazer et al. | 428/86 |
| 7,300,691 B2 | 11/2007 | Callaway et al. | 428/86 |
| 7,318,961 B2 | 1/2008 | Loos et al. | 428/516 |
| 7,892,379 B2 | 2/2011 | Eleazer et al. | 156/182 |
| 8,029,633 B2 | 10/2011 | Nair et al. | 156/167 |
| 8,293,353 B2 | 10/2012 | Eleazer et al. | 428/119 |

(Continued)

*Primary Examiner* — Michael C Miggins

(74) *Attorney, Agent, or Firm* — Cheryl J. Brickey

(57) ABSTRACT

A vehicle containing a composite which has an alternating pattern containing groupings of woven fabric and groupings of biaxially oriented thermoplastic films. The composite has a thickness of greater than about 5 mm. Each grouping of woven fabric contains at least one woven fabric layer, each woven fabric layer containing tape elements having a base layer of a strain oriented olefin polymer disposed between covering layers of a heat fusible olefin polymer. Each grouping of biaxially oriented thermoplastic films contain at least one biaxially oriented thermoplastic film which has a core layer of thermoplastic disposed between covering layers of a thermoplastic able to bond to polypropylene.

13 Claims, 1 Drawing Sheet

(56) References Cited

U.S. PATENT DOCUMENTS

| | | |
|---|---|---|
| 8,309,478 B2 | 11/2012 | Nair et al. .................... 442/364 |
| 9,643,382 B2 | 5/2017 | Eleazer |
| 2007/0071960 A1 | 3/2007 | Eleazer et al. ............. 428/297.7 |
| 2009/0017322 A1 | 1/2009 | Hayes et al. .................. 428/515 |
| 2009/0311930 A1 | 12/2009 | Wang et al. .................. 442/134 |
| 2013/0136904 A1 | 5/2013 | Nair et al. .................... 428/196 |
| 2016/0311147 A1 | 10/2016 | Puthillath et al. |
| 2016/0311261 A1 | 10/2016 | Puthillath et al. |
| 2016/0311262 A1 | 10/2016 | Puthillath et al. |
| 2016/0311263 A1 | 10/2016 | Puthillath et al. |

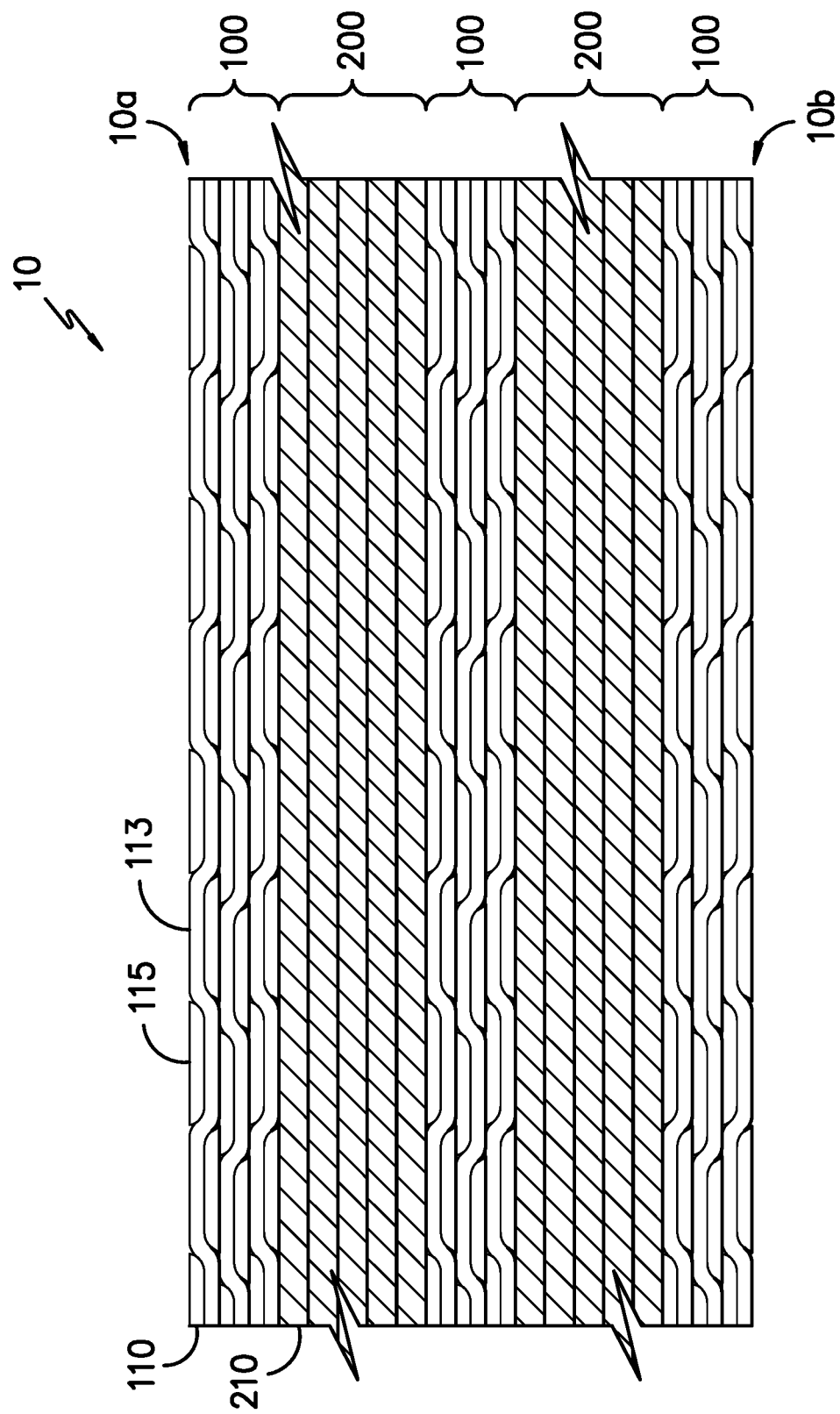

VEHICLE CONTAINING A STIFF COMPOSITE

RELATED APPLICATIONS

This application claims priority to U.S. Provisional Patent Application 62/519,967 "Vehicle Containing a Stiff Composite", filed on Jun. 15, 2017.

TECHNICAL FIELD

The present invention relates to vehicles with components made from composites. More particularly, the invention related to vehicles with components made from composites containing an alternating pattern containing groupings of woven fabric and groupings of biaxially oriented thermoplastic films.

BACKGROUND

Composites are being utilized more in different applications where there is a need for a specific stiffness and/or toughness while minimizing weight and cost. There is a need for vehicles to use composites for the desired physical properties at a low price point.

BRIEF SUMMARY

The disclosure relates to a vehicle containing a composite having an upper and lower surface and an alternating pattern containing groupings of woven fabric and groupings of biaxially oriented thermoplastic films. The composite has a thickness defined to be the distance between the upper and lower surfaces of greater than about 5 mm. Each grouping of woven fabric comprises at least one woven fabric layer, each woven fabric layer comprising warp tape elements in a warp direction and weft tape elements in a weft direction which is approximately perpendicular to the warp direction. The tape elements comprise a base layer of a strain oriented olefin polymer disposed between covering layers of a heat fusible olefin polymer. The warp tape elements and weft tape elements within the woven fabric layer are interwoven and crossover each other at crossover points and the warp elements are bonded to the weft elements within the woven fabric layer at the crossover points. Each grouping of biaxially oriented thermoplastic films comprises at least one biaxially oriented thermoplastic film, where each film comprises a core layer of thermoplastic disposed between covering layers of a thermoplastic able to bond to polypropylene. The layers within each grouping are bonded together, the woven fabric layers and adjacent biaxially oriented thermoplastic films are bonded together, and the total thickness of woven fabric layers to biaxially oriented thermoplastic films within the composite is between about 2:1 to 1:50.

BRIEF DESCRIPTION OF THE DRAWINGS

FIG. 1 illustrates schematically a cross-section of one embodiment of the composite.

DETAILED DESCRIPTION

Referring now to FIG. 1, there is shown one embodiment of the composite 10. The composite has an upper surface 10a and a lower surface 10b. The composite also has an alternating pattern containing groupings of woven fabric 100 and groupings of biaxially oriented thermoplastic films 200. In the embodiment shown in FIG. 1, there are 3 groupings of the woven fabric 100 and 2 groupings of biaxially oriented thermoplastic films 200, where the upper 10a and lower 10b surfaces of the composite are formed by the woven fabric groupings 100. In one embodiment, the composite contains at least one grouping of woven fabric 100 and in another embodiment, the composite contains at least 2 groupings of woven fabric 100. In another embodiment, the composite comprises at least 3, at least 4, or at least 5 groupings of woven fabric 100. In one embodiment, the composite contains at least one grouping of biaxially oriented thermoplastic films 200 and in another embodiment, the composite contains at least 2 groupings of biaxially oriented thermoplastic films 200. In another embodiment, the composite comprises at least 3, at least 4, or at least 5 groupings of biaxially oriented thermoplastic films 200. Preferably, the groupings form an alternating pattern (for example, grouping 100, grouping 200, grouping 100, grouping 200), but the composite may also contain repeating groupings, random patterns of different groupings, or additional films, layers, fabrics, or additional materials between the groupings, between the layers, or on the outside of the composite 10. The number of groupings is selected for the end use properties such as stiffness, toughness, and thickness.

Each grouping of woven fabric 100 comprises at least one woven fabric layer 110, each woven fabric layer comprising warp tape elements in a warp direction and weft tape elements in a weft direction which is approximately perpendicular to the warp direction. In the embodiment of FIG. 1, the groupings of woven fabric 100 each contain 3 woven fabric layers. The groupings may contain as few as one woven fabric layer or as many as required for the desired end use article. In one embodiment, the groupings of the woven fabric 100 contain at least 2 woven fabric layers, more preferably at least 3 woven fabric layers. In another embodiment, the groupings of the woven fabric 100 contain at least 4, at least 5, or at least 6 woven fabric layers. In another preferred embodiment, the groupings of the woven fabric 100 contain between 1 and 3 woven fabric layers. The groupings of woven fabric layers 100 within the composite may all contain the same number of fabric layers (such as shown in FIG. 1), or the different groupings of woven fabric 100 may contain different numbers of woven fabric layers within the composite 10. The same number of layers with in the groupings may be used to simplify manufacture of the composite. Different numbers of layers in the groupings may be used to tailor strength and stiffness characteristics through the composite 10 or may use additional or fewer layers in the groupings forming the outer surfaces 10a and 10b of the composite 10. In one embodiment, the composite 10 preferably includes at least 10 groupings 100 and 10 groupings 200. In another embodiment, the composite 10 preferably includes at least 20 groupings 100 and 20 groupings 200. In another embodiment, the composite 10 preferably includes at least 25 groupings 100 and 25 groupings 200.

Preferably, each woven fabric layer has a thickness of between about 0.05 mm and 0.35 mm, more preferably between about 0.10 mm and 0.20 mm. Preferably, the groupings of woven fabric have a thickness of between about 0.05 mm and 1.0 mm, more preferably between about 0.10 mm and 0.45 mm.

The tape elements comprise a base layer of a strain oriented olefin polymer disposed between covering layers of a heat fusible olefin polymer. The warp tape elements 115 and weft tape elements 113 within the woven fabric layer are interwoven and crossover each other at crossover points and the warp elements 115 are bonded to the weft elements 113 within the woven fabric layer 110 at the crossover points.

Each grouping of biaxially oriented thermoplastic films 200 comprises at least one biaxially oriented thermoplastic film 210, where each film comprises a core layer of thermoplastic disposed between covering layers of a thermoplastic able to bond to polypropylene. In the embodiment of FIG. 1, the groupings of biaxially oriented thermoplastic films 200 each contain 5 biaxially oriented thermoplastic films 210. The groupings may contain as few as one biaxially oriented thermoplastic film or as many as required for the desired end use article. In one embodiment, the groupings of the biaxially oriented thermoplastic films 200 contain at least 2 biaxially oriented thermoplastic films 210, more preferably at least 3 biaxially oriented thermoplastic films. In another embodiment, the groupings of biaxially oriented thermoplastic films 200 contain at least 4, at least 5, or at least 6 biaxially oriented thermoplastic films. The groupings of biaxially oriented thermoplastic films 200 within the composite may all contain the same number of biaxially oriented thermoplastic films (such as shown in FIG. 1), or the different groupings of biaxially oriented thermoplastic films 100 may contain different numbers of biaxially oriented thermoplastic films within the composite 10. The same number of layers within the groupings may be used to simplify manufacture of the composite. The biaxially oriented thermoplastic films 210 within each grouping are bonded together. The biaxially oriented thermoplastic films do more than simply add bulk to the composite or act as an adhesive between the groupings of fabric layers 100, the biaxially oriented thermoplastic films contribute to the physical characteristics of the composite 10.

Preferably, each biaxially oriented thermoplastic film has a thickness of between about 0.01 and 0.25 mm, more preferably between about 0.01 and 0.08 mm. Preferably, the groupings of biaxially oriented thermoplastic films have a thickness of between about 0.05 and 5.0 mm, more preferably between about 0.10 and 1.0 mm.

The composite 10 contains at least 1 grouping of woven fabric 100 and at least 1 grouping of biaxially oriented thermoplastic films 200. In one embodiment, the composite contains 2 groupings of woven fabric 100 and 1 grouping of biaxially oriented thermoplastic films 200, where the groupings 100 sandwich the grouping 200. In another embodiment, the groupings are selected such that both the upper and lower surfaces 10a, 10b are formed by the woven fabric groupings 100. In another embodiment, the groupings biaxially oriented thermoplastic films 200 form the upper and lower surfaces 10a, 10b. In another embodiment, a grouping 100 forms one of the upper or lower surfaces 10a, 10b, a grouping 200 forms the opposite surface.

The composite 10 preferably has a thickness defined to be the distance between the upper 10a and lower 10b surfaces of greater than about 5 mm. In another embodiment, the composite 10 preferably has a thickness of greater than about 7 mm, more preferably greater than about 10 mm. The composite 10 preferably has a stiffness of greater than about 150 N-m, more preferably greater than 500 N-m. This higher stiffness allows for end use applications where flexing of the composite may not be desirable.

The term "bonded" means held together, adhered, or attached and may also be referred to as fused. Preferably, the parts of the composite 10 are bonded together using the covering layers of a heat fusible olefin polymer in the tape elements within the fabric layers 110 and the covering layers of a thermoplastic able to bond to polypropylene of the biaxially oriented thermoplastic films 210. This bonding or fusing may be accomplished by using heat to partially melt and bond the elements together or by using an additional adhesive that may be heat, light, or monomer initiator, or UV activated.

The composite 10 is fully bonded together, within each woven fabric layer 110, the warp elements 115 are bonded to the weft elements 113 at the crossover points, the tape elements from one woven fabric layer are bonded to tape elements from adjacent woven fabric layers within the groupings of woven fabric, the biaxially oriented thermoplastic films 100 are bonded to adjacent biaxially oriented thermoplastic films 100 within the groupings of biaxially oriented thermoplastic films 200, and tape elements adjacent biaxially oriented thermoplastic films (from adjacent groupings 100, 200) are bonded together. This forms a strong and high performing composite material. Having the elements within the composite 10 being fused to one another provides resistance to unraveling and may provide better tear resistance, higher tensile modulus, and better stability.

There may be embodiments where the bonds are not as strong, i.e., not all of the tape elements and/or biaxially oriented thermoplastic films are bonded as much as they could be. This may be advantageous for flexibility and/or other performance characteristics such as ballistics performance.

The layers, the woven fabric layers and adjacent biaxially oriented thermoplastic films are bonded together forming the composite. Within the composite, the total thickness of woven fabric layers (of all of the groupings of woven fabric) to biaxially oriented thermoplastic films (of all of the groupings of biaxially oriented thermoplastic films) is between about 3:1 to 1:50. More preferably the ratio is between about 2:1 to 1:20, more preferably between about 1:1 to 1:10.

The first woven layer 100 and the second woven layer 200 contain fibers in the warp and weft direction, where the fibers may be any suitable fiber. Preferably, the fibers are tape elements. Preferably, the tape elements are monofilament fibers having a rectangular cross-section and are continuous. The tape element is considered to have a rectangular cross-section even if one or more of the corners of the rectangular are slightly rounded or if the opposing sides are not perfectly parallel. Having a rectangular cross-section may be preferred for a variety of reasons. Firstly, the surface available for bonding is greater. Secondly, during a de-bonding event the whole width of the tape is under tension and shear points are significantly reduced or eliminated.

In one embodiment, the tape elements have a cross-sectional shape with a width between about 0.05 mm and 10 mm more preferably between about 0.1 mm and 5 mm and a height between about 10 μm and 500 μm more preferably between about 20 μm and 200 μm. In one embodiment, the aspect ratio comparing the width of the rectangular cross-section to the height of the rectangular cross-section is between about 0.25 and 500.

The tape elements may be formed from any suitable material. Preferably, the tape elements comprise a thermoplastic polymer. Some suitable materials include, but are not limited to, polypropylenes, polyethylenes, polyesters, polyamides, polyethers, copolymers of any of the above; glass, aramid, carbon, ceramic, nylon, polyetherimide, polyamide-imide, polyphenylene sulfide, polysulfones, polyimide, conjugated polymers, mineral fiber, natural fibers, metallic fiber or mixtures thereof. In one embodiment, the tape elements 50 have a tensile modulus of greater than 10 grams per denier as measured by ASTM method 3811-07 and/or a tensile strength of at least 100 MPa. In one embodiment, the tape elements comprise polypropylene. Polypropylene may be preferred for some applications due to its strength, ability to be oriented, and low cost.

In one embodiment, the tape elements contain a base layer of a strain oriented olefin polymer disposed between covering layers of a heat fusible olefin polymer. Alternatively, it is contemplated that only a single covering layer may be present. The base layer of the tape elements is preferably compatibly bonded to each of covering layers between their contiguous surfaces. It is further contemplated that the covering layers have a softening temperature, or melting temperature, lower than that of the base layer. The base layer may be, but is not limited to, a polyolefin polymer such as polypropylene, polyethylene, a polyester such as polyethyleneterephthalate, or a polyamide such as Nylon 6 or Nylon 6-6. According to one potentially preferred practice, the base layer may be polypropylene or polyethylene. The base layer may account for about 50-99 wt. % of the tape element, while the covering layers account for about 1-50 wt. % of the tape element. Preferably, the base and covering layers are made up of the same class of materials to provide an advantage with regard to recycling and adhesion.

In an embodiment where the base layer contains polypropylene, the material of covering layers is preferably a copolymer of propylene and ethylene or an α-olefin and has a lower melting temperature than the base layer. One example of a suitable tape element is TEGRIS™ available from Milliken & Company.

The tape elements may be produced in any suitable manner. In one embodiment, the tape elements may be formed by slitting a film. The film may be formed by any conventional means of extruding such multilayer polymeric films. By way of example, and not limitation, the film may be formed by blown film or cast film extrusion. The film is then cut into a multiplicity of longitudinal strips of a desired width by slitting the film to yield tape elements having the desired cross-sections. The tape elements may then be drawn in order to increase the orientation of the tape element so as to provide increased strength and stiffness of the material. In another embodiment, an already oriented (mono or bi axially) film is then slit into tape elements.

In another embodiment, the tape elements are extruded from a slit die then oriented. The process begins with slit extruding molten polymer to form fibers having a rectangular cross-section. The die typically contains between 5 and 60 slits, each one forming a fiber. In one embodiment, the each slit die has a width of between about 15 mm and 50 mm and a thickness of between about 0.6 and 2.5 mm. The fibers once extruded are typically 4 to 12 mm wide and after drawing are typically 1 to 3 mm wide. The fibers may be extruded having one layer or may have a second layer and/or a third layer using co-extrusion.

The woven fabric layers 100 may be any suitable textile layer. This includes but is not limited to a woven, nonwoven, unidirectional, or knit textile. The textile layer contains interstices which are spaces between the fibers of the textile layer. The tighter the textile layer construction, the smaller the interstices.

Preferably, the woven fabric layers 110 are woven layers where warp tape elements running in the warp direction are interwoven with weft tape elements running in the weft direction in transverse relation to the warp tape elements. The weft tape elements are interwoven with the warp tape elements such that a given weft extends in a predefined crossing pattern above and below the warp. Where the warp and weft elements cross over each other are defined to be cross-over points. In one embodiment, the weft tape elements and the warp tape elements are formed into a so called plain weave wherein each weft tape element passes over a warp tape element and thereafter passes under the adjacent warp tape element in a repeating manner across the full width of the woven layer. However, it is also contemplated that any number of other weave constructions as will be well known to those of skill in the art may likewise be utilized. By way of example only, and not limitation, it is contemplated that the weft tape elements may pass over two or more adjacent warp tape elements before transferring to a position below one or more adjacent warp fibers thereby forming a twill weave. The term "interwoven" is meant to include any construction incorporating inter-engaging formation fibers. In one embodiment, the woven layers are, for example, plain, satin, twill, basket-weave, poplin, jacquard, and crepe weave woven layers. Preferably, the woven layers are either a plain or twill weave woven layer. It has been shown that plain weaves have good abrasion and wear characteristics. A twill weave has been shown to have good aesthetic properties and for compound curves so may also be preferred for molded parts or rubber articles. Within the groupings of woven fabric 100 and between the groupings of woven fabric, the woven fabric layers 110 be the same or different. They might be different in their tape element construction, aspect ratio, materials or in their weave formation.

Preferably, the biaxially oriented thermoplastic films have a core layer of thermoplastic disposed between covering layers of a thermoplastic able to bond to polypropylene. Preferably, the tensile strength in the machine direction of the film is between 100 and 275 MPa and in the transverse direction of between about 140 and 300 MPa (testing according to ASTM D882).

One method for producing the composite 10 is to stack all of the layers together (all of the woven fabric layers 110 and the biaxially oriented thermoplastic films 210) and then consolidate the entire composite 10 at once. In another embodiment, the groupings 100, 200 may be consolidated first, then stacked together and reconsolidated together. Consolidation occurs when heat and optionally pressure is added such that all of the elements bond or fuse together to form a composite that may be handled without falling apart. Preferably, the composite is heated at a temperature below the softening point of the core of tape elements and the films 210 and preferably higher than the melting point of the covering layers of the tape elements and the films 210.

Consolidation may be performed by any suitable method. Heated batch or platen presses may be used for consolidation. In one exemplary practice, autoclaves or vacuum bags may be used to provide the pressure during consolidation. Continuous consolidation methods such as calendaring or use of a single or double belt laminator or extrusion laminator may likewise be employed. It is contemplated that any other suitable press may likewise be used to provide appropriate combinations of temperature, pressure, and residence time.

The composite may contain additional fibers, additives, or layers. Examples of additional fibers that may be incorporated include, but are not limited to fibers made from highly oriented polymers, such as gel-spun ultrahigh molecular weight polyethylene fibers, melt-spun polyethylene fibers, melt-spun nylon fibers, melt-spun polyester fibers, sintered polyethylene fibers, rigid-rod polymers, carbon fibers, aramid fibers, glass fibers, polylactic acid fibers, and natural fibers such as cotton. Additives, such as processing aids, colorants (dyes or pigments), or fillers may be added.

"Vehicle" is defined to mean any means in or by which someone travels or something is carried or conveyed and includes planes, helicopters, boats, and vehicles that move on land. In one embodiment, the vehicle is selected from the group consisting of a car, a truck, a camper, a bus, a van, a kayak, a canoe, an unmanned aerial vehicle (UAV), an unmanned ground vehicle (UGV), an armored vehicle, or a utility vehicle. The composite may be used in any suitable part of the vehicle. In one embodiment, the composite is used as at least a portion of an underbody shield of the vehicle. In another embodiment, the composite is used as at least a portion of a seat of the vehicle. In another embodiment, the composite is used as at least a portion of a door of the vehicle. In another embodiment, the composite is used as at least a portion of an areo splitter of the vehicle. The composite may be molded or shaped for contour, structure, or appearance reasons by cold or hot forming methods.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A vehicle comprising a composite having an upper and lower surface comprising an alternating pattern containing groupings of woven fabric and groupings of biaxially oriented thermoplastic films, wherein the composite has a thickness defined to be the distance between the upper and lower surfaces of greater than about 5 mm, wherein the composite comprises;
    wherein each grouping of woven fabric comprises at least one woven fabric layer, each woven fabric layer comprising warp tape elements in a warp direction and weft tape elements in a weft direction which is approximately perpendicular to the warp direction, wherein the tape elements comprise a base layer of a strain oriented olefin polymer disposed between covering layers of a heat fusible olefin polymer, wherein the warp tape elements and weft tape elements within the woven fabric layer are interwoven and crossover each other at crossover points, wherein the warp elements are bonded to the weft elements within the woven fabric layer at the crossover points;
    wherein each grouping of biaxially oriented thermoplastic films comprises at least one biaxially oriented thermoplastic film, wherein each film comprises a core layer of thermoplastic disposed between covering layers of a thermoplastic able to bond to polypropylene, wherein the layers within each grouping are bonded together;
    wherein woven fabric layers and adjacent biaxially oriented thermoplastic films are bonded together;
    wherein the total thickness of woven fabric layers to biaxially oriented thermoplastic films within the composite is between about 2:1 to 1:50.

2. The vehicle of claim 1, wherein the vehicle is selected from the group consisting of a car, a truck, a camper, a bus, a van, an unmanned aerial vehicle (UAV), an unmanned ground vehicle (UGV), an armored vehicle, or a utility vehicle.

3. The vehicle of claim 1, wherein the vehicle comprises an underbody shield comprising the composite.

4. The vehicle of claim 1, wherein the vehicle comprises at least one seat comprising the composite.

5. The vehicle of claim 1, wherein the vehicle comprises a door comprising the composite.

6. The vehicle of claim 1, wherein the vehicle comprises an areo splitter comprising the composite.

7. The vehicle of claim 1, wherein the composite has a stiffness of greater than about 150 N-m.

8. The vehicle of claim 1, wherein the composite comprises 2 groupings of woven fabric.

9. The vehicle of claim 1, wherein the composite comprises 1 grouping of biaxially oriented thermoplastic films.

10. The vehicle of claim 1, wherein the composite comprises at least 2 groupings of woven fabric.

11. The vehicle of claim 1, wherein the composite comprises at least 2 grouping of biaxially oriented thermoplastic films.

12. The vehicle of claim 1, wherein each grouping of woven fabric comprises at least two woven fabric layers.

13. The vehicle of claim 1, wherein each grouping of biaxially oriented thermoplastic films comprises at least two biaxially oriented thermoplastic films.

* * * * *